E. E. LAWRENCE.
STERILIZER FOR REMOVING CAKE ICING.
APPLICATION FILED NOV. 22, 1912.
1,208,335.
Patented Dec. 12, 1916.
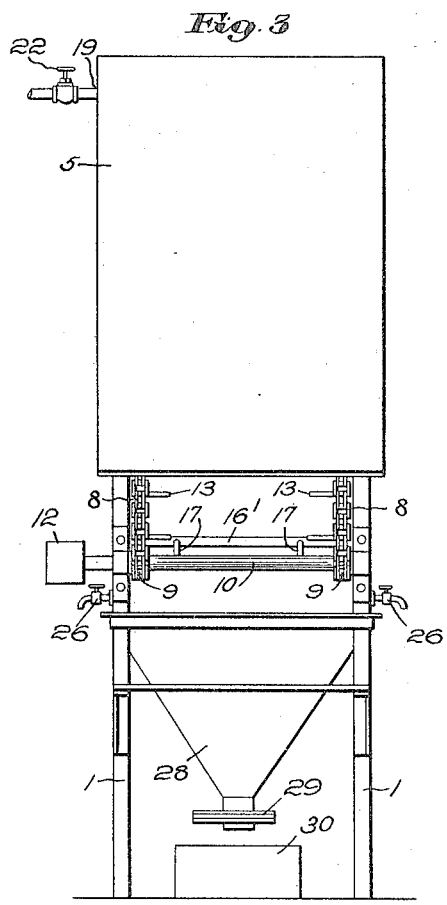
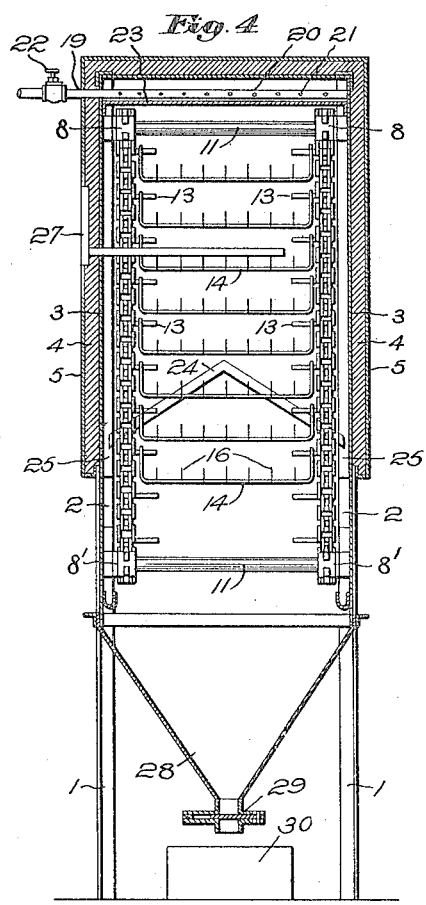
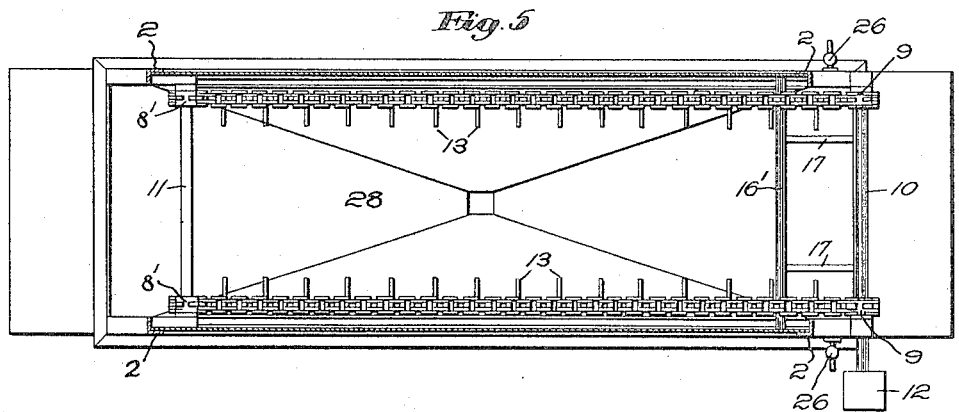
Witnesses:
Horace A. Crosman
Carl L. Choate.
Inventor:
Edward E. Lawrence.

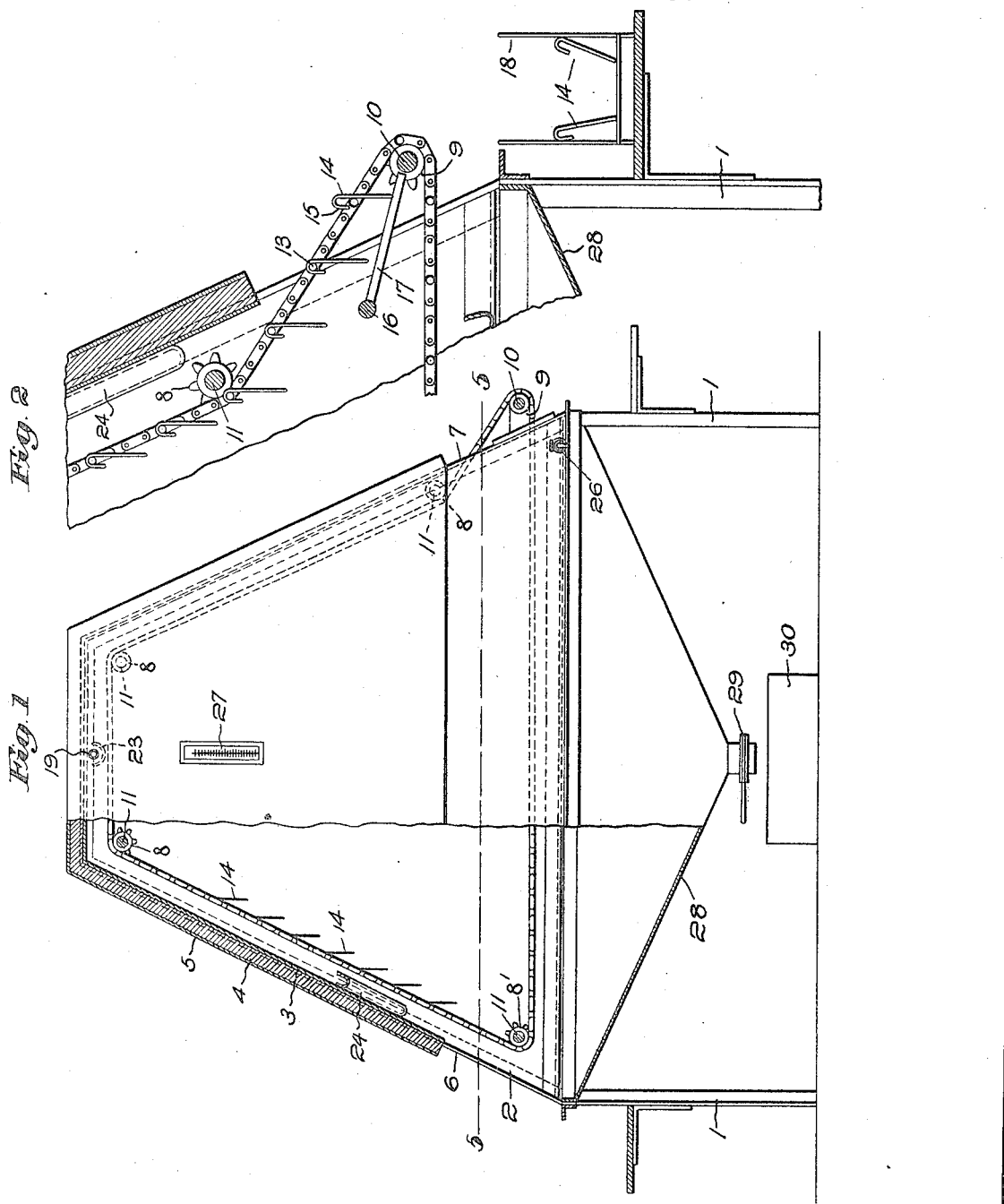

UNITED STATES PATENT OFFICE.

EDWARD E. LAWRENCE, OF CAMBRIDGE, MASSACHUSETTS, ASSIGNOR TO LOOSE-WILES BISCUIT COMPANY, OF KANSAS CITY, MISSOURI, A CORPORATION OF MISSOURI.

STERILIZER FOR REMOVING CAKE-ICING.

1,208,335.  Specification of Letters Patent.  Patented Dec. 12, 1916.

Application filed November 22, 1912. Serial No. 732,814.

*To all whom it may concern:*

Be it known that I, EDWARD E. LAWRENCE, a citizen of the United States, and a resident of Cambridge, in the county of Middlesex and State of Massachusetts, have invented an Improvement in Sterilizers for Removing Cake-Icing, of which the following description, in connection with the accompanying drawings, is a specification, like characters on the drawings representing like parts.

This invention relates to sterilizers, particularly intended for use in removing icing from wire trolley hooks on which the cakes are supported while subjected to the icing operation and for thoroughly cleansing said hooks.

An incidental purpose of the invention is the reclaiming of the icing removed from the hooks.

In order that the invention may be clearly understood I have disclosed a single embodiment thereof in the accompanying drawings, wherein—

Figure 1 is a view, partially in side elevation and partially in vertical longitudinal section, of a sterilizer embodying my invention; Fig. 2 is a detail in vertical, longitudinal section, representing a portion of the discharge end of the sterilizer; Fig. 3 is a rear end elevation of the sterilizer; Fig. 4 is a vertical transverse section thereof; and Fig. 5 is a longitudinal transverse section thereof on the line 5—5 of Fig. 1.

Cakes and like edibles have long been coated with icing. This operation is customarily practised by hanging the cakes upon hooks carried by so-called icing trolleys. The cakes so carried are passed to and fro through suitable driers and are ultimately removed from the hooks. It has been exceedingly difficult to remove the icing from the said hooks so that the latter are in satisfactory condition for re-use. Heretofore so far as I am aware, the hooks have been washed in hot water and the water has been boiled down so as to reclaim the sugar of the icing. This process is objectionable for several reasons, one of which is that it necessitates the use of more steam than the reclaimed sugar is worth.

In accordance with my invention I provide a suitable conveyer preferably composed of a pair of chains corresponding in all substantial respects to the so-called icing trolley. These chains are provided with suitable projections to receive the hooks. The chains or other suitable conveyers travel through a suitable sterilizer, wherein they are subjected to the action of superheated steam. In this manner, the icing is very quickly and inexpensively removed from the hooks, and the icing may be reclaimed at small expense.

Other features of the invention will be set forth in detail.

Referring more particularly to the drawings, the uprights or standards of the apparatus are indicated at 1 in the several figures, being composed preferably of four angle iron members suitably connected together and having extending upwardly therefrom a suitable housing. This housing may be composed of a suitable number of angle iron members 2 arranged in a general truncated, pyramidal form and having an inner sheathing or facing of galvanized sheeting 3 or other suitable material. Preferably I provide some suitable non-heat-conducting or insulating surface, such, for example, as eighty-five per cent. magnesia blocks 4 which may be secured in position by magnesia cement or any other suitable manner. I may provide an outer facing 5 of some suitable material, such, for example, as a layer of cheese cloth painted with enamel. It is to be understood, however, that the housing and its support may be of any suitable construction.

The housing is entirely closed at its upper end, but at its lower end is entirely open across the entire inlet end 6 and the entire outlet end 7.

While any suitable conveyer may be provided for the hooks, I preferably employ a pair of endless chains 8 which may be substantially identical in construction with the so-called icing trolley chains. These chains are supported upon suitable sprocket wheels 8′, 9, arranged upon shafts 10, 11, the shaft 11 being shown as mounted interiorly of the housing. The shaft 10 is represented as exterior to the outlet end of the housing and as provided with a pulley 12 by which the said shaft may be positively driven from any suitable source of power. Preferably the sprocket pinions 8′ are not positively driven.

The chains 8 are provided with suitable inwardly extending projections 13 arranged in pairs, and upon which the hooks 14 are placed by the attendant at the inlet end 6. These so-called hooks, as more clearly shown in Fig. 4, are preferably of general U-shape, the upturned arms of which are provided with hooked or looped extremities 15 taking over the said projections 13. Upwardly extending from the cross portion of the hooks 14 are the pins 16, upon which the iced cakes or other articles are suitably impaled. In using these hooks the cakes are customarily impaled upon the pins 16, and the hook is then manually dipped with the cakes into the icing container, and then hung upon the trolley chains of the drier. In this dipping and drying operation, the entire surface of the hooks becomes coated with the icing, and as the icing dries it becomes very difficult to remove.

It will be observed that the hooks 14 are suspended upon the projections 13 with the open side of the terminal hook toward the attendant. This is preferably done in order to permit the ready and automatic removal of the hooks from the chains 8 after treatment in the sterilizer. The hooks may be removed in any suitable manner from the chains. It is obvious, however, that they are discharged in a highly heated condition. For this reason, and also in order to operate the apparatus at less expense, I preferably provide for the automatic discharge of the hooks. In this embodiment of the invention, I accomplish this result by providing a transverse shaft 16′ having extending therefrom a pair of rods 17 here shown as extending into proximity to the shaft 10. The hooks 14 as they arrive at the point of discharge ride upon the upper surface of the rods 17, as represented in Fig. 2, and are thus released from their supporting projections 13. In the onward movement of the chains, these projections 13 tumble the hooks off the rods 17, so that they fall into a suitable receiver 18, as represented in Fig. 2. The chains 8 are endless, as represented, so that the described operation may be continued indefinitely.

In order to provide a suitable agent for removing the icing, I introduce steam into the housing. For this purpose, I have provided a steam inlet pipe 19, which, as indicated at 20 in Fig. 4, extends transversely across the housing and is provided with small discharge openings 21. The inlet pipe 19 is provided with a suitable valve 22, and in order to secure the best results, the steam at a suitable pressure, as, for example, fifty pounds, is admitted into the sterilizer until all water is blown out of the pipes. Then the valve 22 is shut off until it is barely opened, the steam pipe being preferably covered up to the point where it enters the sterilizer, as it is of exceeding importance in obtaining the best results that the steam be dry. By very slightly opening the valve, the steam is throttled and so is raised to a higher temperature as it is discharged than it would be if the valve were fully opened. Preferably the steam is discharged into the housing at a temperature of 212° F., that is, it is superheated.

Immediately beneath the steam inlet pipe 20, I preferably provide a gutter or deflector 23 which is here shown as extending transversely of the housing. Not only does this gutter or deflector prevent the direct downward discharge of the admitted steam, but it conducts all water of condensation to the side walls of the housing, as clearly shown in Fig. 4.

It is important that the water of condensation be promptly removed from the housing, and that it shall not drip into the reclaimed icing. Therefore I provide certain of the walls of the housing, as, for example, the two end walls, with inclined gutters or troughs 24, one of which is indicated in Fig. 4. As there shown, this gutter is of general inverted V-form, and is open at its upper face along its entire length so as to receive all water of condensation that may trickle down the end wall. Both of the end troughs 24 discharge downwardly, as indicated in said figure, into troughs 25, which extend along substantially the lower edges of the side walls, being suitably inclined if desired and provided with suitable outlets 26, which may be provided with valves.

The housing is preferably provided with a suitable pyrometer 27 inserted in one of the walls thereof.

The icing, customarily containing sugar, glucose and gelatin, drips from the hooks into a suitable hopper 28 tapered as represented and arranged below the inlet and outlet openings 6 and 7 for the hooks. This hopper is preferably provided with a suitable valve 29, which is desirably a quick opening valve and may be of the so-called Lunkenheimer type. Beneath the hopper, I may provide a suitable receptacle 30 to receive the icing. It will be observed that the housing is entirely open at the ends where the hooks are inserted and discharged. The superheated dry steam admitted at the upper part of the housing fills substantially the entire inclosure of the housing, but across the lower end of the housing at about the level of the top of the openings 6 and 7, a veil or layer of saturated steam extends. This saturated steam does not perform any function in the cleaning of the hooks, but does form a seal for the overlying superheated steam. The temperature of the layer of saturated steam is substantially 200° to 212° F.

From the foregoing description, it will be evident that the icing hooks may be readily and thoroughly cleaned at slight expense, and that if desired the sugar of the icing may be reclaimed. The employment of superheated steam is of great importance, as by its use I have solved the problem of thoroughly cleaning the hooks at comparatively slight expense.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A sterilizer and cleanser for icing hooks and other articles, comprising in combination, a housing open at its lower part to receive said hooks or other articles, and closed against the escape of steam except at said open lower part, means for introducing superheated steam into a portion of said housing above said open lower part and for interposing a layer or veil of saturated steam at the said open lower part, and means for passing the icing hooks or other articles to be sterilized and cleansed into said housing through said veil of saturated steam into the zone of superheated steam and again through said veil of saturated steam out of said housing.

2. A sterilizer and cleanser for icing hooks and other articles, comprising in combination a housing open at its lower part to receive said hooks or other articles, and closed against the escape of steam except at said open lower part, means for introducing superheated steam into a portion of said housing above said open lower part whereby a layer or veil of saturated steam is interposed at the said open lower part, and means to subject the icing hooks or other articles to be sterilized and cleansed to the action both of the superheated steam in the upper portion of the casing and of the said veil of saturated steam.

3. A sterilizer and cleanser for icing hooks and other articles comprising in combination, a housing permanently open at its lower part to receive said hooks or other articles, means for admitting superheated steam into the portion of said housing above said permanently open part, means including a deflector for the steam adjacent the point of inlet thereof for maintaining superheated steam in said housing and constituting means to direct water of condensation to a wall of the housing out of contact with said icing hooks or other articles.

4. A sterilizer and cleanser for icing hooks and other articles comprising in combination, a housing having a permanently open, lower part, means for introducing superheated steam into said housing at its upper portion and for maintaining superheated steam therein, and troughs arranged along walls of the housing for conducting off water of condensation, thereby to prevent contact of said water of condensation with said hooks or other articles.

5. A sterilizer for icing hooks and the like comprising in combination a housing for the reception of the sterilizing fluid, an endless chain conveyer having icing hook receiving projections and guides to engage said hooks adjacent the point of discharge, to release said hooks from said receiving projections.

6. A sterilizer for icing hooks and the like comprising in combination a housing for the reception of the sterilizing fluid, said housing having open inlet and outlet portions, an endless chain conveyer supported within said housing and extending into proximity to said inlet and outlet portions for the manual application and automatic discharge of the hooks, and guides to engage said hooks adjacent the outlet and to release therefrom the chain.

7. A sterilizer for icing hooks and the like comprising in combination a housing having means for introducing superheated steam thereinto, said housing having a permanently open lower end, chain conveyers having means to support icing hooks, said chains having inclined runs supported adjacent the front and rear of the housing for the manual application and automatic discharge of the hooks, provisions for maintaining a saturated steam seal adjacent the open part of said casing, and guides adjacent the discharge to contact with the hooks and effect their automatic release from said chains.

8. An apparatus for subjecting articles to the action of steam, comprising in combination a housing having means for introducing steam thereinto, a conveyer for conveying articles within said housing, and a hopper for receiving drippings from said articles, the housing having a trough for receiving water of condensation and maintaining it out of contact with said drippings.

9. An apparatus for sterilizing icing hooks, comprising in combination a housing having means for introducing steam into the upper portion thereof, said housing being permanently open at its lower portion, a conveyer to receive the hooks and to convey them through and discharge them from the housing, and a hopper for receiving the melted icing from said hooks, said housing having a trough for receiving water of condensation and maintaining it out of contact with the drippings from said hooks.

10. A sterilizer and cleanser for icing hooks and other articles comprising in combination, a housing permanently open at its lower part to receive said hooks or other articles, and closed at its upper part against the escape of steam, means for admitting superheated steam to the upper portion of said housing and to said articles while in the upper part thereof and for sealing the article admission opening of said housing by a layer of saturated steam, whereby the articles are subjected to the action of the superheated steam in said housing, and may be subjected to the action of said layer of saturated steam.

11. A sterilizer and cleanser for icing hooks and other articles comprising in combination, a housing permanently open at its lower part to receive said hooks or other articles, means for compressing steam and for thereafter admitting it in a superheated condition to the upper portion of said housing and to the articles in said upper portion thereof, and for sealing the open bottom of the housing by the condensed layer or stratum of the steam, whereby the articles are subjected to the action of the superheated steam in said housing, and means for passing said icing hooks or other articles into the housing through said permanently open, lower part, thence upward within and through said housing.

12. A sterilizer and cleanser for icing hooks and other articles comprising in combination, a housing permanently open at its lower part to receive said hooks or other articles, means for introducing superheated steam through and into the upper portion of said housing, said housing being structurally closed against the escape of steam except at its open, lower portion, means for effecting the sealing up of the open, lower part of the housing by a veil or layer of saturated steam, and means for passing the icing hooks or other articles to be sterilized and cleansed into said housing through said veil of saturated steam, thence upwardly inside the housing into the saturated steam therein, and finally downwardly in said housing and out therefrom through said veil of saturated steam and said open, lower end.

13. A sterilizer and cleanser for icing hooks and other articles, comprising in combination a housing open at its lower part to receive said icing hooks or other articles, and closed against the escape of steam except at said open lower part, means for introducing superheated steam into a portion of said housing above said open lower part, whereby a sealing veil or layer of saturated steam is interposed at said open lower part.

In testimony whereof, I have signed my name to this specification, in the presence of two subscribing witnesses.

EDWARD E. LAWRENCE.

Witnesses:
ARTHUR C. ROCHE,
WILLIAM W. CLARK.

Copies of this patent may be obtained for five cents each, by addressing the "Commissioner of Patents Washington, D. C."